(12) United States Patent
Buerkle et al.

(10) Patent No.: US 8,565,975 B2
(45) Date of Patent: Oct. 22, 2013

(54) METHOD AND DEVICE FOR THE CONTROL OF A DRIVER ASSISTANCE SYSTEM (75) Inventors: Lutz Buerkle, Leonberg (DE); Tobias Rentschler, Pforzheim (DE); Thomas App, Bretten (DE)

(73) Assignee: Robert Bosch GmbH, Stuttgart (DE)

( * ) Notice: Subject to any disclaimer, the term of this patent is extended or adjusted under 35 U.S.C. 154(b) by 771 days.

(21) Appl. No.: 12/450,745

(22) PCT Filed: Mar. 19, 2008

(86) PCT No.: PCT/EP2008/053264
§ 371 (c)(1),
(2), (4) Date: Mar. 17, 2010

(87) PCT Pub. No.: WO2008/131991
PCT Pub. Date: Nov. 6, 2008

(65) Prior Publication Data
US 2010/0185363 A1    Jul. 22, 2010

(30) Foreign Application Priority Data
Apr. 30, 2007  (DE) .......................... 10 2007 020 280

(51) Int. Cl.
*A01B 69/00*    (2006.01)
*B62D 6/00*    (2006.01)
*B63G 8/20*    (2006.01)
*B63H 25/04*    (2006.01)
*G05D 1/00*    (2006.01)
*G06F 17/00*    (2006.01)

(52) U.S. Cl.
USPC ................... 701/41; 701/42; 701/43; 701/44; 701/1

(58) Field of Classification Search
USPC ....................................................... 701/41, 36
See application file for complete search history.

(56) References Cited

U.S. PATENT DOCUMENTS

| 5,229,941 | A | * | 7/1993 | Hattori .......................... 701/26 |
| 5,350,912 | A | * | 9/1994 | Ishida .......................... 250/202 |
| 5,700,073 | A | * | 12/1997 | Hiwatashi et al. ............. 303/146 |
| 6,092,619 | A | * | 7/2000 | Nishikawa et al. ........... 180/446 |
| 6,151,539 | A | * | 11/2000 | Bergholz et al. ................ 701/25 |
| 6,216,079 | B1 | * | 4/2001 | Matsuda ......................... 701/70 |
| 6,463,369 | B2 | * | 10/2002 | Sadano et al. .................. 701/28 |
| 6,542,800 | B2 | * | 4/2003 | Kawazoe et al. ................ 701/41 |
| 6,879,890 | B2 | * | 4/2005 | Matsumoto et al. ............ 701/23 |
| 7,069,129 | B2 | * | 6/2006 | Iwazaki et al. .................. 701/41 |
| 7,510,038 | B2 | * | 3/2009 | Kaufmann et al. ........... 180/169 |
| 7,555,367 | B2 | * | 6/2009 | Kuge ................................ 701/1 |

(Continued)

FOREIGN PATENT DOCUMENTS

DE    199 48 913    5/2000
DE    101 37 292    3/2003

(Continued)

*Primary Examiner* — Bhavesh V Amin
(74) *Attorney, Agent, or Firm* — Kenyon & Kenyon LLP (57) ABSTRACT

A method and a device for controlling a driver assistance system using an LKS function of a vehicle, in which the LKS function is activated within predefinable boundary values and is deactivated outside these system boundaries. According to the invention, in response to the deactivation of the LKS function during cornering of the vehicle, the LKS function is transferred from a regulation to a control, in such a way that, during the cornering, the driver continues to be supported by a system torque in the transverse guidance of the vehicle at least over a certain stretch of path.

16 Claims, 5 Drawing Sheets

(56) References Cited

U.S. PATENT DOCUMENTS

| | | | |
|---|---|---|---|
| 2002/0007236 A1* | 1/2002 | Sadano et al. | 701/28 |
| 2002/0013647 A1* | 1/2002 | Kawazoe et al. | 701/41 |
| 2004/0267423 A1* | 12/2004 | Iwazaki et al. | 701/41 |
| 2005/0125125 A1* | 6/2005 | Matsumoto et al. | 701/41 |
| 2005/0240328 A1* | 10/2005 | Shirato et al. | 701/41 |
| 2005/0267661 A1* | 12/2005 | Iwazaki et al. | 701/41 |
| 2006/0030987 A1* | 2/2006 | Akita | 701/41 |
| 2006/0047390 A1* | 3/2006 | Scherl et al. | 701/41 |
| 2009/0222170 A1* | 9/2009 | Scherl et al. | 701/44 |
| 2009/0271071 A1* | 10/2009 | Buerkel et al. | 701/41 |
| 2010/0004821 A1* | 1/2010 | Buerkle et al. | 701/41 |
| 2010/0138101 A1* | 6/2010 | Buerkle et al. | 701/29 |
| 2010/0228438 A1* | 9/2010 | Buerkle et al. | 701/41 |
| 2010/0286866 A1* | 11/2010 | Buerkle et al. | 701/35 |

FOREIGN PATENT DOCUMENTS

| | | |
|---|---|---|
| DE | 103 11 518 | 11/2003 |
| DE | 10 2004 048 047 | 4/2006 |
| DE | 10 2005 033 866 | 1/2007 |
| WO | WO 2007/009850 | 1/2007 |
| WO | WO 2007/042462 | 4/2007 |

\* cited by examiner

METHOD AND DEVICE FOR THE CONTROL OF A DRIVER ASSISTANCE SYSTEM

BACKGROUND OF THE INVENTION

1. Field of the Invention

The present invention relates to a method and a device for controlling a driver assistance system.

2. Description of Related Art

Driver assistance systems are known which support the driver in keeping to a selected traffic lane. For this purpose, the driver assistance system includes assistance functions, such as LDW (lane departure warning) and LKS (lane keeping support). Assistance function LDW warns the driver of leaving the traffic lane by generating optical and/or acoustic and/or haptic signals. Assistance function LKS actively intervenes in on-board systems of the vehicle, such as the steering system and/or the braking system or an ESP system, in order to keep a vehicle deviating from the traffic lane in the traffic lane.

For this purpose, the driver assistance system includes a sensor system including in particular at least one video sensor for recording traffic lane markings or the like.

Such Driver assistance systems are known, for example, from published German patent document DE 103 11 518.

From published German patent document DE 101 37 292, a method is known for operating a driver assistance system of a vehicle, particularly of a motor vehicle, having servo-supported steering. This method is characterized by the following steps:

- recording or estimating surroundings data, preferably of an instantaneous traffic situation,
- recording or estimating preferably instantaneous motion data of the vehicle,
- comparing the recorded or estimated surroundings data to the motion data of the vehicle,
- modifying the support of a steering handle in accordance with the comparison.

When a specified system boundary is reached, for instance, by the loss of the traffic lane or its marking, the exceeding of a maximum value of the transverse acceleration, or the like, these assistance systems deactivate by reducing the steering torque applied to the steering wheel by the assistance system. The driver then has to take over again completely the transverse guidance of the vehicle himself. If this takes place abruptly in difficult driving situations, such as in cornering, it may not only be perceived by the driver as disturbing, but may also bring on a difficult situation.

In the following, by an LKS function we shall understand a function for the transverse guidance of the vehicle, with whose aid the vehicle is able to be kept in one's own traffic lane.

SUMMARY OF THE INVENTION

The present invention is based on the object of improving a driver assistance system of the species to the extent that it increases the system acceptance by the driver, and that driving comfort is improved thereby.

Starting from a method or a device for controlling a driver assistance system according to the definition of the species in Claim 1 and 2 or 16, the object is attained by converting the LKS function from a regulation into a control, in response to the deactivation of the LKS function during cornering. This preferably takes place in such a way that, during cornering, the driver continues to be supported by a steering wheel torque in the transverse guidance of the vehicle, at least for a certain length of travel.

The present invention makes possible an additional improvement in driving comfort in a vehicle furnished with a driver assistance system, and thereby enables increased acceptance of such a system by the driver. When there is a deactivation of the LKS function, sufficient time remains for the driver to prepare for his autonomous guidance of the vehicle, and this is because when a system boundary is reached, for instance, by leaving the traffic lane and the resulting deactivation of the LKS function of the driver assistance system, the steering torque generated at the steering wheel during cornering is not completely restored, rather, the current steering wheel torque is restored to a partial value. By having this slow adjustment, dangerous situations are avoided.

Especially advantageously, boundary values are specified for the activation and deactivation of the LKS function, in such a way that the LKS function is activated within the boundary values and deactivated outside the boundary values, said boundary values being continuously monitored during travel of the vehicle, the course of the traffic lane being monitored, and, the LKS function being switched over from a regulation to a control when cornering is recorded and the impending deactivation of the LKS function as a result of the exceeding of a predefinable boundary value.

In response to the deactivation of the LKS function, the steering torque exerted by the LKS function on the steering of the vehicle is particularly advantageously controlled along a first stretch of path to a specified value, this value being held essentially constant along a second stretch of path, and the controlled steering torque exerted by the LKS function on the steering of the vehicle being returned to zero along a third stretch of path.

A threshold value is advantageously specified for the curvature of the setpoint trajectory. The curvature of the setpoint trajectory is recorded during travel of the vehicle. Cornering is assumed if the recorded curvature of the setpoint trajectory exceeds the specified threshold value in absolute amount, during travel In one particularly advantageous exemplary embodiment, the return of the steering torque to a controlled value or to the value zero takes place according to a linear function.

DETAILED DESCRIPTION OF THE INVENTION

Specific embodiments of the present invention are explained in greater detail below, with reference to the drawings. The following concepts are used in this context. A regulated torque mustered by the LKS function (LKS=lane keeping support) is designated as steering torque. A controlled torque which has to be mustered at the steering wheel of the vehicle for cornering is designated as aligning torque. The torque mustered at the steering wheel of the vehicle by the system is designated as the steering wheel torque. In this instance, the previously defined torques steering torque or aligning torque may be involved. The torque mustered at the steering wheel by the driver of the vehicle is designated as the driver torque.

The essence of the invention is that, in response to the deactivation of the LKS function of the driver assistance system, a transfer takes place from an LKS regulation to an LKS control, in dependence upon the respective situation. In this way it is advantageously achieved that the LKS steering torque is not completely withdrawn from the driver during cornering, for example, but that a system torque is generated which still affords him partial support. This avoids the support in transverse guidance, by the driver assistance system, ceasing abruptly during cornering, and having this cause dangerous situations.

Figure 1:
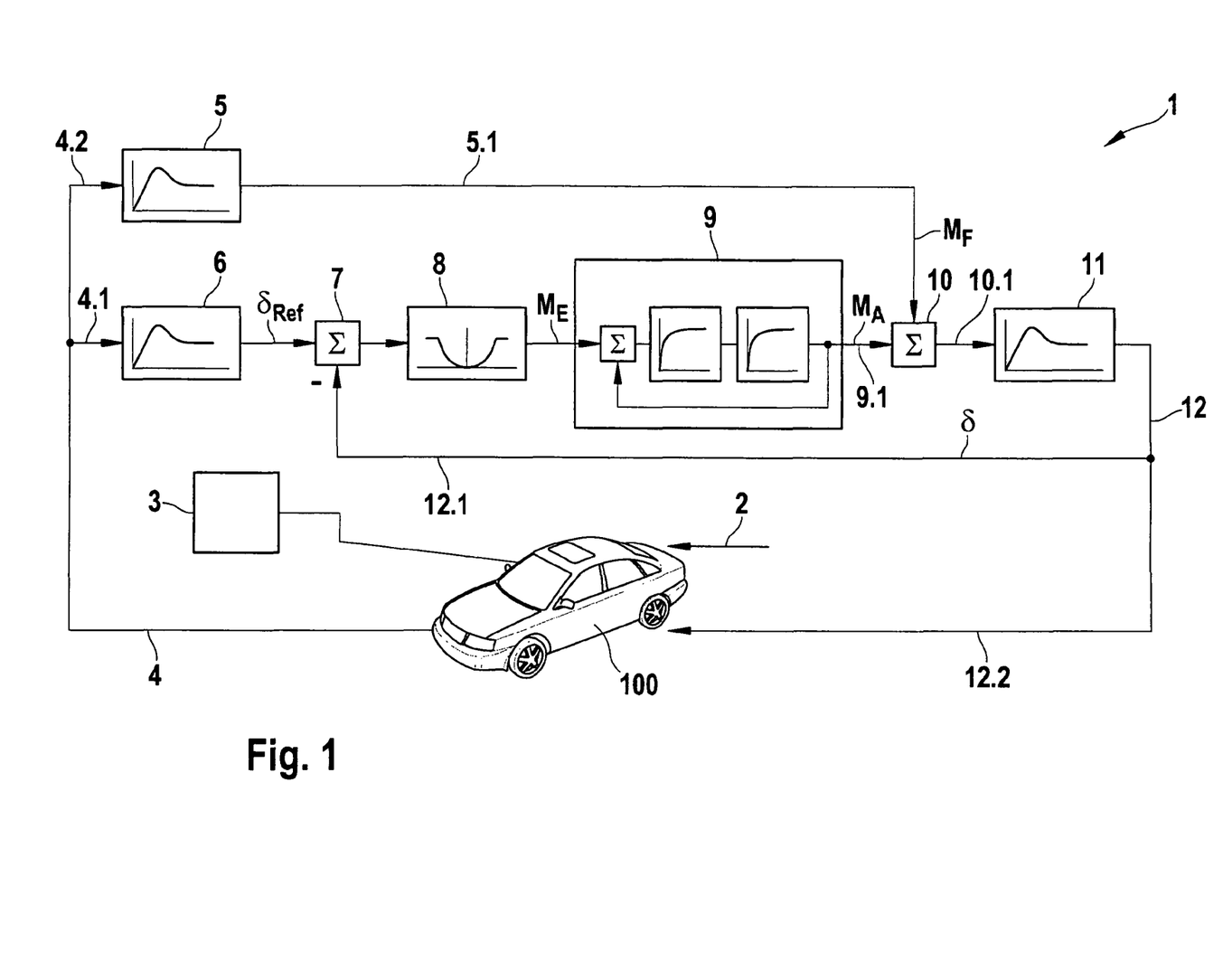
FIG. 1 shows a block diagram of a driver assistance system having an LKS function.
Figure 2:
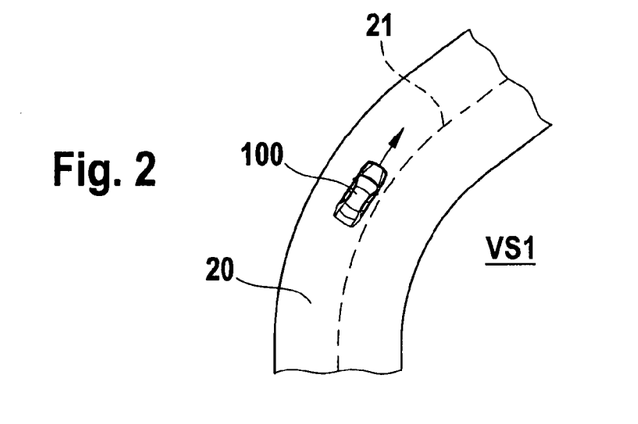
FIG. 2 shows a schematic representation of a first traffic situation.
Figure 3:
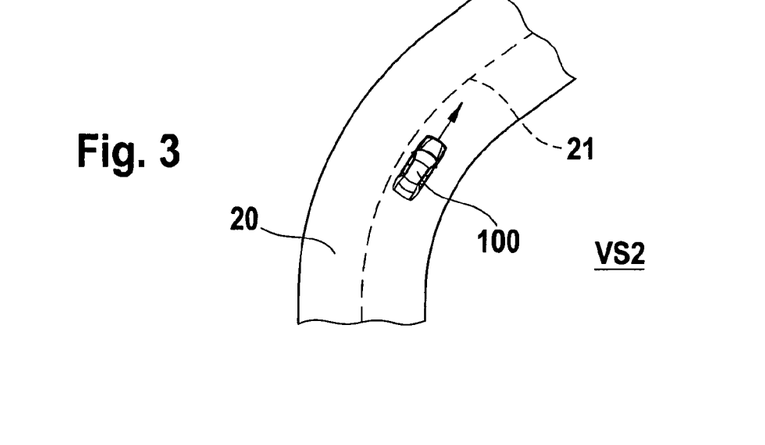
FIG. 3 shows a schematic representation of a second traffic situation.
Figure 4:
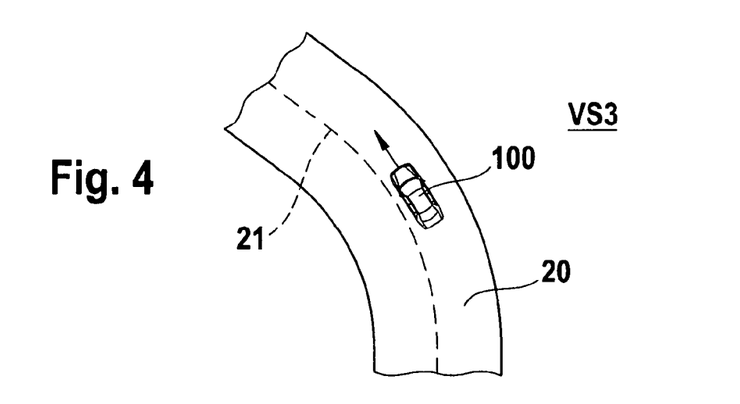
FIG. 4 shows a schematic representation of a third traffic situation.
Figure 5:
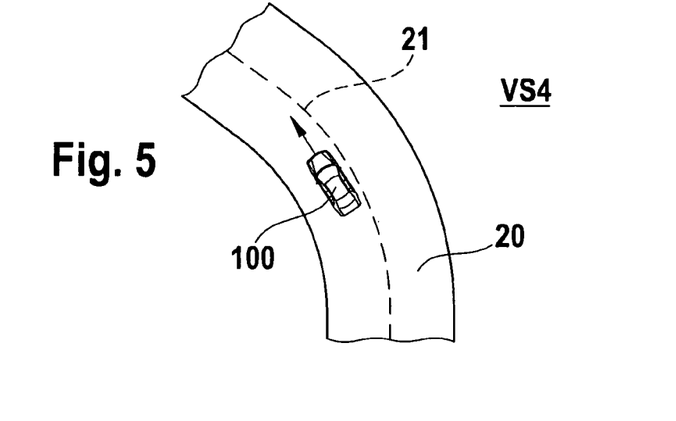
FIG. 5 shows a schematic representation of a fourth traffic situation.
Figure 6:
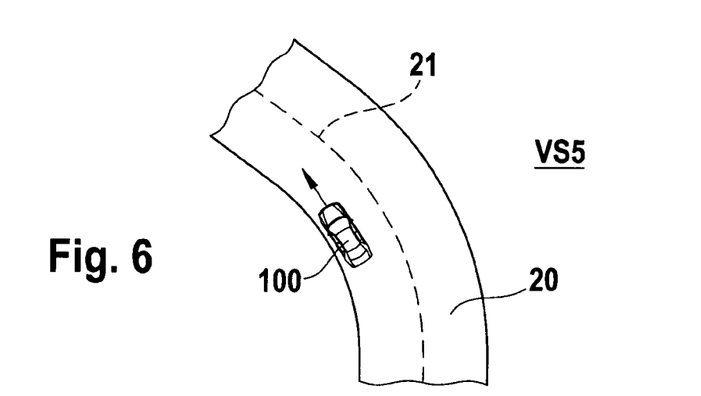
FIG. 6 shows a schematic representation of a fifth traffic situation.
Figure 7:
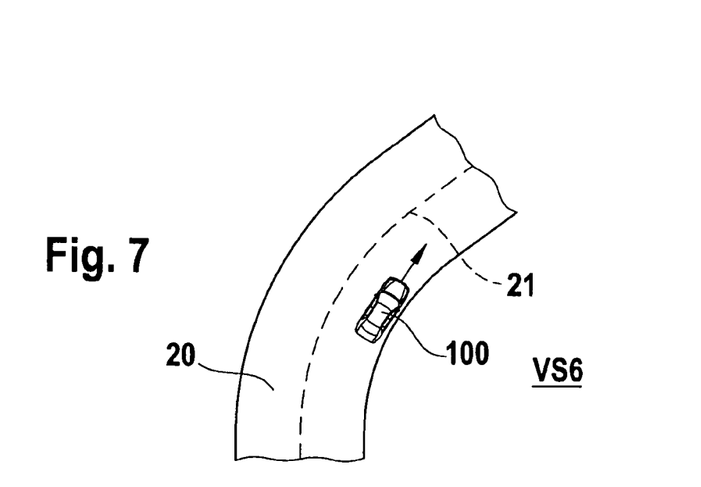
FIG. 7 shows a schematic representation of a sixth traffic situation.

FIG. 1 shows a block diagram of a driver assistance system 1 having the LKS function, situated in a vehicle 100. The deviation of the vehicle, the differential angle and the curvature of the traffic lane are recorded by appropriate sensors, such as particularly one video sensor 3, and are supplied to a functional module 6 of driver assistance system 1 via paths 4, 4.1. Functional module 6 includes a reference model for the transverse guidance of vehicle 100, which forms a reference angle $\delta_{Ref}$ from the input variables named. This reference angle is supplied to a first input of a functional module 7 (a summation node), whose output is connected to a functional module 8. Functional module 8 includes a guidance characteristics curve for the LKS function of driver assistance system 1. Functional module 8 is connected to a functional module 9. This functional module 9 is a steering control element having a torque control loop. Functional module 9 is connected to a first input of an additional functional module 10 (a summation node) via path 9.1. At the same time, the driver (functional module 5) records the driving situation (path 4.2) and controls vehicle 100 using the steering wheel (path 5.1). The driver's command and the system reaction act in common (functional module 10) on steering system 11 (path 10.1) of vehicle 100 and control (paths 12, 12.2) its transverse motion. Interferences act on vehicle 100 via path 2 that is indicated schematically. A reaction to functional module 7 takes place via paths 12, 12.1.

Torque $M_A$, that is generated by the LKS function of driver assistance system 1 and supplied to steering system 11 of vehicle 100, is not reduced to zero in the case of deactivation of the LKS function. Rather, a transition from a regulating intervention to a controlling intervention is generated, depending on the respective situation. A deactivation of the LKS function takes place, for example, if the traffic lane is left or if predefined system boundaries, such as a minimum or a maximum speed threshold, are exceeded. For example, in order to guide vehicle 100 through a curve, the LKS function of driver assistance system 1 has to muster a steering wheel torque at the steering wheel of vehicle 100, so as to hold the wheels of the vehicle in a position that is required for driving through the curve. This required steering wheel torque, which results from the front-axle geometry of the vehicle, is designated as the aligning torque. This aligning torque is calculated based on a model (functional module 8) based on the curvature of the setpoint trajectory (path 4.1) of vehicle 100. If no interfering influences occurred, and if one knew the course of the curve exactly, it would be sufficient to pre-steer this aligning torque on the steering wheel of the vehicle, so that the vehicle would follow the course of the curve. Since interferences do, however, act on vehicle 100 during travel which, for instance, are conditioned upon the inclination of the roadway, a regulating intervention has to take place, using the LKS function. This intervention has as its aim, leading vehicle 100 on a setpoint trajectory 21, such as in the middle of roadway 20, or to support the driver in the guidance of vehicle 100 by a directed steering torque at the steering wheel. For this purpose, a steering intervention is generated, using the LKS function, in such a way that, for instance, lateral deviations of the vehicle relative to the setpoint trajectory are indicated to the driver. For this purpose, driver assistance system 1 carries out a regulated intervention using the LKS function. If the LKS function is activated, and carries out such regulating interventions, the LKS function is deactivated when a boundary provided in the system is reached. While the currently traveled lane curvature is compared to a threshold value, it is first checked whether the vehicle is just now traveling through a curve. If this is not the case, the LKS function of the driver assistance system is deactivated in the usual manner, by slowly reducing the steering torque, mustered at the steering wheel of the vehicle, to zero. If, on the other hand, the vehicle is just traveling through a curve, the control of the LKS function is carried out according to the present invention. For this purpose, the driver assistance system compares the steering torque mustered by the system at the steering wheel to the aligning torque that is sufficient for the pure curve travel, to the aligning torque that is sufficient for the safe curve travel, to the steering wheel torque mustered by the driver and to the detected course of the road. According to one advantageous refinement, even the situation classification is able to be supported using the support of additional sensors, particularly radar sensors. Thus, for instance, the presence of a curve may be recorded from the collective motions, recorded by the sensors, of objects such as other traffic participants. From these variables, the following situations are classified according to the rules described here.

In the following, this will be explained further, with reference to FIG. 2 through FIG. 7.

In a first traffic situation VS1 (FIG. 2), vehicle 100 is traveling a curve. The aligning torque mustered using the LKS function of the driver assistance system is negative, and less than the negative aligning torque. It may be concluded from this that vehicle 100 is driving through a right-hand curve. Vehicle 100 is located to the left of setpoint trajectory 21, in this context.

In a second traffic situation VS2 (FIG. 3), vehicle 100 is again traveling a curve. The aligning torque mustered using the LKS function is negative and greater than the negative aligning torque. It may be concluded from this that vehicle 100 is traveling through a right-hand curve and that vehicle 100 is located to the right of setpoint trajectory 21.

In a third traffic situation VS3 (FIG. 4), vehicle 100 is again traveling a curve. The aligning torque of the LKS function is positive and greater than the positive aligning torque. It may be concluded from this that vehicle 100 is driving through a left-hand curve. Vehicle 100 is located to the right of setpoint trajectory 21, in this context.

In a fourth traffic situation VS4 (FIG. 5), vehicle 100 is again traveling a curve. The aligning torque of the LKS function is positive and less than the positive aligning torque. It may be concluded from this that vehicle 100 is driving through a left-hand curve. Vehicle 100 is located to the left of setpoint trajectory 21, in this context.

In a fifth traffic situation VS5 (FIG. 6), vehicle 100 is again traveling a curve. The aligning torque of the LKS function is negative and the aligning torque is positive. It may be concluded from this that vehicle 100 is driving through a left-hand curve. Vehicle 100 is located far left of setpoint trajectory 21, in this context.

In a sixth traffic situation VS6 (FIG. 7), vehicle 100 is again traveling a curve. The aligning torque of the LKS function is positive and the aligning torque is negative. It may be concluded from this that vehicle 100 is driving through a right-hand curve. Vehicle 100 is located far right of setpoint trajectory 21, in this context.

An immediate deactivation of the LKS function, using a gradual reduction of the steering torque or the aligning torque, to the value zero is carried out in this instance, if the driver steers vehicle 100 to the outside area of the curve, in the six traffic situations described before in exemplary fashion. This is the case if the two following conditions are satisfied:

$$K_{Traj} \langle -K_{Curve\ and\ MDriver} \langle -M_{Interv} \quad (1)$$

as well as $$K_{Traj} \rangle K_{Curve\ and\ MDriver} \rangle M_{Interv} \quad (2)$$

Meanings of equation terms:
$K_{Traj}$=the curvature of the setpoint trajectory;
$K_{curve}$=the curvature threshold value, as of which cornering is detected;
$M_{Driver}$=the torque generated by the driver on the steering wheel;
$M_{interv}$=the steering wheel torque which differentiates a driver intervention from sensor noise, for instance.

One essential method step of the method according to the present invention is that, in above-mentioned traffic situations 1, 3, 5 and 6, steering torque $M_{Steering}$ currently mustered by the LKS function is modified to the value of aligning torque $M_{Aligning}$ during Phase 1 (FIG. 8) over a stretch of path $S_{Red}$. In doing this, the transition of the regulated steering torque of the LKS function to a controlled aligning torque of the LKS function is consummated. During distance traveled $S_{Hold}$ subsequently by the vehicle, the controlled aligning torque is held constant in Phase 2. Finally, in Phase 3, along stretch of path $S_{Zero}$, the controlled aligning torque is reduced to the value zero, and, accordingly, the LKS function of driver assistance system 1 is deactivated.

Figure 8:
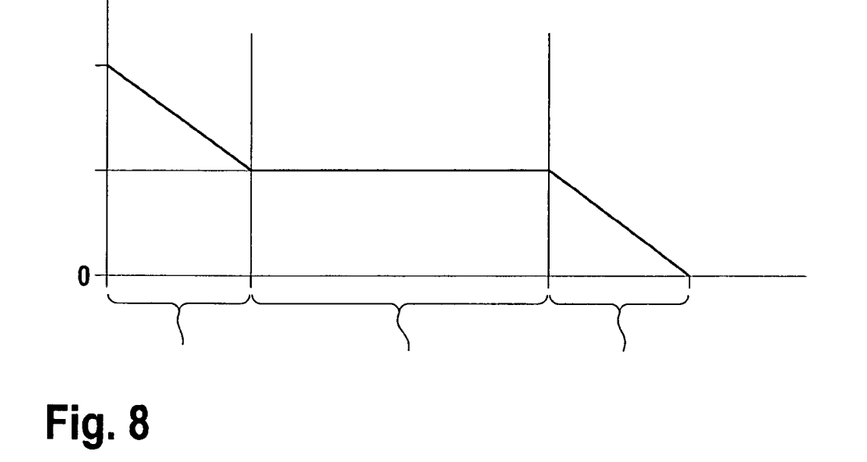
FIG. 8 shows the representation of the intervention torque in a first exemplary embodiment.

In the exemplary embodiment shown in FIG. 8, the described lowering takes place according to a linear function. In other, alternative embodiment variants, the lowering may also take place according to a different functional dependence. For instance, the lowering may take place according to a cubic function or according to a function of a higher order. During travel on stretch of path $S_{Hold}$, if another traffic lane having a validly measured curvature of the curve is detected, then the controlled aligning torque is able to be calculated based on these measured values and mustered at the steering wheel of vehicle 100. If no traffic lane is detected, the controlled aligning torque from the last measured curvature of the setpoint trajectory may be used instead.

Figure 9:
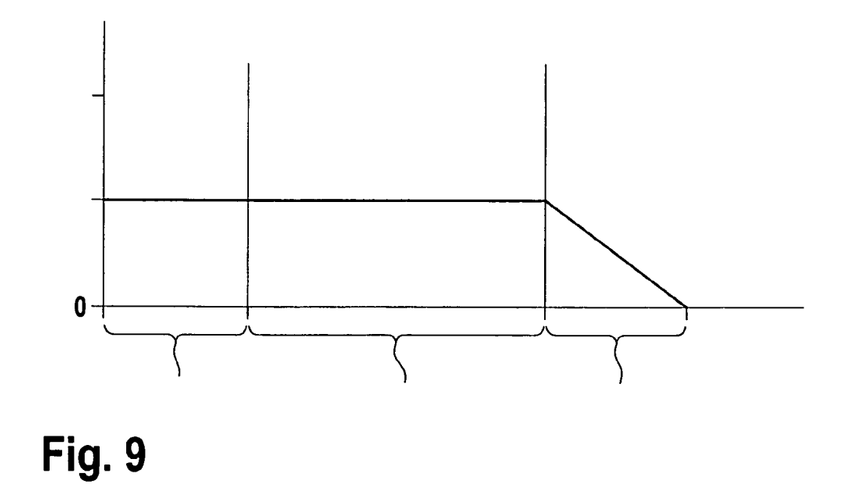
FIG. 9 shows the representation of the intervention torque in a second exemplary embodiment.

In traffic situations two and four described in exemplary fashion above, the current aligning torque is lower than the aligning torque required for cornering. In these traffic situations, since the driver has knowingly reduced the steering torque of the LKS function, the current steering torque is maintained during the transition from a regulated to a controlled system intervention, as shown by the illustration in FIG. 9 (Phase 1 and Phase 2 along stretches of path $S_{Red}$ and $S_{Hold}$). In Phase 3, along stretch of path $S_{Zero}$, the maintained steering torque is then lowered to zero, as in the two traffic situations mentioned before. The determination of the lengths of stretches of path $S_{Red}$, $S_{Hold}$ and is then expediently performed based on a video preview, that is, based on signals supplied by a video sensor. If the entire course of the curve is detectable using the video preview, or the lane detection is able to be maintained during cornering, the stretches of path named may advantageously also be adjusted in such a way that stretch of path $S_{Hold}$ extends over the entire length of the curve. Furthermore, in one alternative variant, it is also conceivable that an adaptation of the stretches of path is also possible by a steering intervention of the driver. In this case, a driver activity measure may be defined as derived from the steering interventions of the driver. The length of path $S_{Hold}$ may be shortened as a function of this driver activity measure, since one may assume that the driver himself will take over the steering task.

Figure 10:
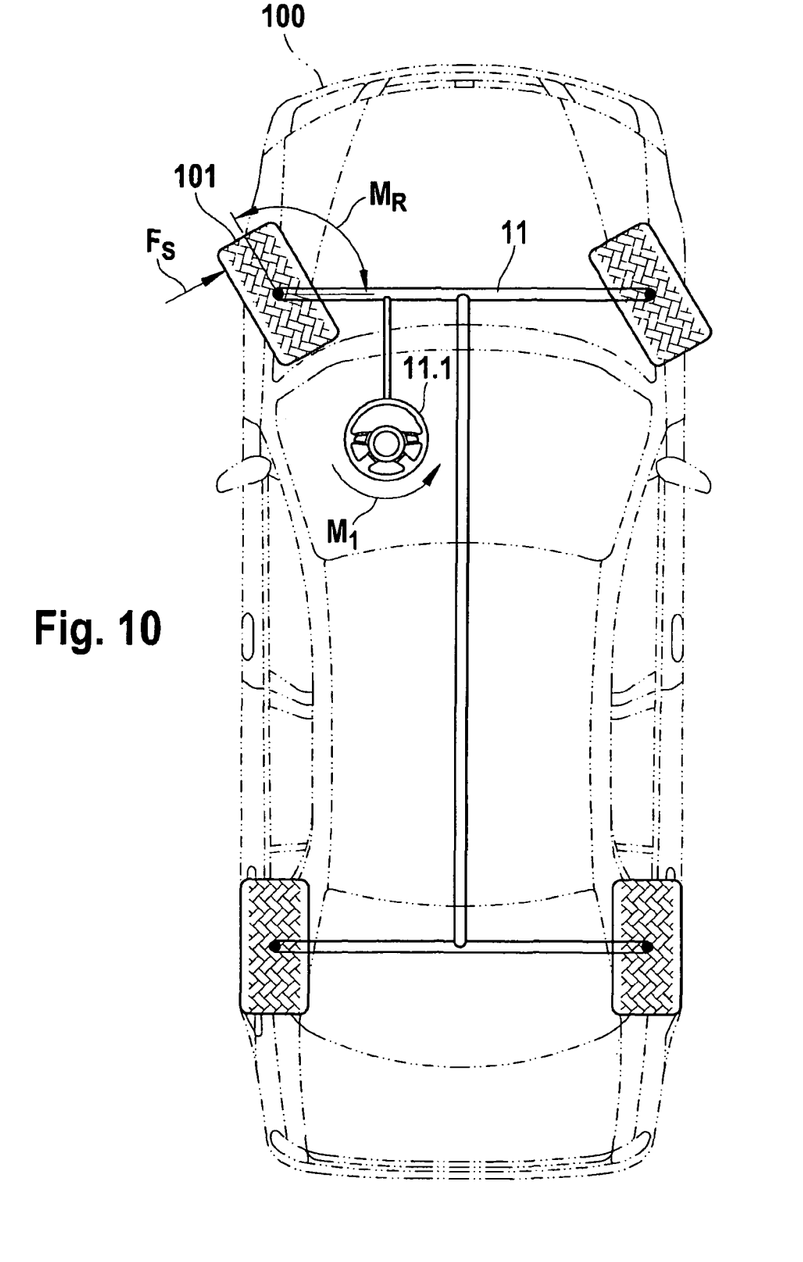
FIG. 10 shows a schematic representation of a vehicle.

FIG. 10 shows a schematic representation of vehicle 100, having a wheel 101, a steering system 11 and a steering wheel 11.1, to clarify steering torque $M_1$ mustered by the LKS function of driver assistance system 1 and aligning torque $M_R$ that comes about from the front-axle geometry. In order for the wheels to remain turned in for cornering, $M_R=M_1$ has to apply.

What is claimed is:

1. A method for controlling a driver assistance system using a function for transverse guidance of a vehicle, comprising:
   activating the function, by a processor, within predefinable boundary values; and
   deactivating the function, by the processor, during cornering of the vehicle when outside the boundary values, the deactivating being performed in such a way that, during at least part of the cornering, the driver is supported by a system steering torque exerted by the function on steering of the vehicle, the deactivating including:
   controlling the steering torque to a specifiable value along a first stretch of path;
   subsequently holding the steering torque essentially constant at the specifiable value along a second stretch of path; and
   restoring the steering torque to zero along a third stretch of path.

2. The method as recited in claim 1, further comprising:
   continually monitoring said boundary values during travel of the vehicle; and
   monitoring a course of a traffic lane of the vehicle.

3. The method as recited in claim 1, wherein the specifiable value is predefined in such a way that the steering wheel of the vehicle is held in the position required for traveling a setpoint trajectory.

4. The method as recited in claim 3, wherein a threshold value is specified for the curvature of the setpoint trajectory, the curvature of the setpoint trajectory is recorded during travel of the vehicle, and cornering is assumed if the curvature of the setpoint trajectory recorded during travel exceeds the specified threshold value in absolute amount.

5. The method as recited in claim 1, wherein the return of the steering torque to a controlled value or to the value zero takes place according to a linear function.

6. The method as recited in claim 1, wherein the return of the steering torque to a controlled value or to the value zero takes place according to a function of a higher order.

7. The method as recited in claim 1, wherein the lengths of the first, second, and third stretches of path are dependent on a traffic situation.

8. The method as recited in claim 1, wherein the lengths of the first, second, and third stretches of path depend on a reaction of the driver.

9. The method as recited in claim 1, wherein a driver activity measure is derived from steering interventions of the driver, and the lengths of the first, second, and third stretches of path are adjusted as a function of the derived driver activity measure.

10. The method as recited in claim 1, wherein the lengths of the first, second, and third stretches of path are established as a function of signals of a video sensor.

11. The method as recited in claim 7, wherein the traffic situations are classified, and the regulation or control of the steering wheel torque takes place as a function of the respectively present classification of the traffic situation.

12. The method as recited in claim 11, wherein the classification of the respective traffic situation is recorded using additional sensors.

13. The method as recited in claim 1, wherein an immediate deactivation of the function is carried out using a gradual reduction of the steering torque to the value zero when the driver steers towards an outer part of a curve.

14. The method as recited in claim 4, wherein an immediate deactivation of the function is carried out using a gradual reduction of the steering torque to the value zero when the threshold value is undershot.

15. The method as recited in claim 11, wherein the classification of the respective traffic situation is recorded using a radar sensor.

16. An apparatus for controlling a driver assistance system that provides a function for transverse guidance of a vehicle, which is activated within predefinable boundary values and is deactivated outside the boundary values, wherein the apparatus comprising:
 a hardware controller arrangement that is configured to,
  perform the deactivation of the function during cornering of the vehicle in such a way that, during at least part of the cornering, the driver is supported by a system steering torque exerted by the function on steering of the vehicle, the deactivation including:
  controlling the steering torque to a specifiable value along a first stretch of path;
  subsequently holding the steering torque essentially constant at the specifiable value along a second stretch of path; and
  restoring the steering torque to zero along a third stretch of path.

* * * * *

UNITED STATES PATENT AND TRADEMARK OFFICE
CERTIFICATE OF CORRECTION

PATENT NO.      : 8,565,975 B2
APPLICATION NO. : 12/450745
DATED           : October 22, 2013
INVENTOR(S)     : Buerkle et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 909 days.

Signed and Sealed this
Fifteenth Day of September, 2015

Michelle K. Lee
*Director of the United States Patent and Trademark Office*